(12) United States Patent
Bonnamour et al.

(10) Patent No.: US 7,469,030 B2
(45) Date of Patent: Dec. 23, 2008

(54) SPACER GRID FOR A FUEL UNIT IN A NUCLEAR REACTOR COOLED BY LIGHT WATER

(75) Inventors: Bruno Bonnamour, Villeurbanne (FR); Michel Bonnamour, Lyons (FR); Jacques Gauthier, Cailloux sur Fontaines (FR); Hubert Salaun, Lyons (FR)

(73) Assignee: Framatome ANP, Courbevoie (FR)

( * ) Notice: Subject to any disclaimer, the term of this patent is extended or adjusted under 35 U.S.C. 154(b) by 0 days.

(21) Appl. No.: 10/509,146

(22) PCT Filed: Mar. 25, 2003

(86) PCT No.: PCT/FR03/00945

§ 371 (c)(1), (2), (4) Date: Sep. 24, 2004

(87) PCT Pub. No.: WO03/083877

PCT Pub. Date: Oct. 9, 2003

(65) Prior Publication Data

US 2005/0226358 A1     Oct. 13, 2005

(30) Foreign Application Priority Data

Mar. 29, 2002 (FR) .................................. 02 04034

(51) Int. Cl.
  *G21C 3/34* (2006.01)
(52) U.S. Cl. ...................... 376/438; 376/439; 376/442; 376/443

(58) Field of Classification Search ................. 376/439, 376/462, 442, 438, 435, 434, 441, 443, 449
See application file for complete search history.

(56) References Cited

U.S. PATENT DOCUMENTS 3,361,640 A * 1/1968 Hassig et al. ............... 376/434
3,764,470 A * 10/1973 Calvin ........................ 376/439
3,809,609 A * 5/1974 Krawiec et al. ............. 376/439
3,933,584 A * 1/1976 Litt ............................. 376/439

(Continued)

FOREIGN PATENT DOCUMENTS

DE      199 16 893 C1    10/2000

(Continued)

OTHER PUBLICATIONS

Merriam-Wenster's Collegiate Dictionary, 10th Edition, p. 63.*

(Continued)

*Primary Examiner*—Rick Palabrica
(74) *Attorney, Agent, or Firm*—Davidson, Davidson, & Kappel, LLC

(57) ABSTRACT

A spacer grid for a fuel assembly in a light-water-cooled nuclear reactor, for providing the transverse retention of a bundle of fuel rods in mutually parallel arrangements, having an array of cells juxtaposed and placed in a regular lattice, each bounded and separated from neighboring cells by at least one peripheral wall which is open at two opposed ends, along the direction of an axis of the cell, so as to receive a fuel rod of cylindrical general shape passing along the cell along its axis parallel to the peripheral wall.

8 Claims, 6 Drawing Sheets

U.S. PATENT DOCUMENTS

| | | | |
|---|---|---|---|
| 4,135,972 A * | 1/1979 | Anthony et al. | 376/442 |
| 4,252,613 A * | 2/1981 | Jabsen | 376/439 |
| 4,268,356 A * | 5/1981 | Kmonk et al. | 376/462 |
| 4,576,786 A * | 3/1986 | DeMario | 376/439 |
| 4,726,926 A * | 2/1988 | Patterson et al. | 376/439 |
| 4,803,043 A * | 2/1989 | DeMario et al. | 376/442 |
| 4,844,860 A * | 7/1989 | Hatfield | 376/439 |
| 4,895,698 A * | 1/1990 | DeMario | 376/442 |
| 4,923,669 A * | 5/1990 | DeMario | 376/442 |
| 5,243,635 A * | 9/1993 | Bryan | 376/442 |
| 5,247,551 A * | 9/1993 | van Swam | 376/441 |
| 5,265,140 A * | 11/1993 | Perrotti | 376/439 |
| 5,365,557 A * | 11/1994 | Meseth | 376/439 |
| 5,793,832 A * | 8/1998 | Lettau | 376/442 |
| 6,526,116 B1 * | 2/2003 | Nguyen et al. | 376/439 |

FOREIGN PATENT DOCUMENTS

| | | |
|---|---|---|
| EP | 0 237 064 A2 | 9/1987 |
| EP | 0 308 701 A1 | 3/1989 |
| EP | 0 455 847 A1 | 11/1991 |
| EP | 0 534 254 A1 | 3/1993 |
| FR | 2 531 258 A1 | 2/1984 |
| FR | 2 541 810 A1 | 8/1984 |
| WO | WO 03/083877 A2 | 10/2003 |

OTHER PUBLICATIONS

Definition of the term, "around", taken from www.dictionary.com, accessed Apr. 9, 2008.*

* cited by examiner

SPACER GRID FOR A FUEL UNIT IN A NUCLEAR REACTOR COOLED BY LIGHT WATER

FIELD OF THE INVENTION

The invention relates to a spacer grid for a fuel assembly in a light-water-cooled nuclear reactor.

BACKGROUND INVENTION

Light-water-cooled nuclear reactors and in particular pressurized-water-cooled nuclear reactors use fuel assemblies comprising a bundle of fuel rods held in place by a framework in mutually parallel arrangements.

The fuel assembly framework comprises, in particular, a plurality of spacer grids distributed along the length of the fuel assembly, in the axial direction of the bundle of rods. The spacer grids ensure transverse retention of the rods and comprise a set of juxtaposed cells arranged in a regular lattice, generally with square lattice cells, the cells themselves having a square cross section in a transverse plane of the spacer grid perpendicular to the axis of the rods. Each of the cells is bounded and separated from the adjacent cells by a peripheral wall having the shape of the lateral surface of a square-based parallelepiped. The cells of the spacer grid are open at their two ends in the axial direction of the cells, so that each of the cells can receive a rod in a central position, in which the axis of the rod is placed along the axis of the cell. The fuel rods have a substantially smaller diameter than the sides of the square cells, so that a free space remains around the rod, between the cylindrical external surface of the rod and the peripheral wall of the cell in which the rod is engaged axially. The spacer grid includes, in each of the cells intended for housing a fuel rod, bearing and retaining means intended to come into contact with the external surface of the fuel rod, in order to ensure that the rod is held in place in transverse directions perpendicular to the axis of the rod and of the cell, while still permitting the rod to move in the axial direction, for example owing to the effect of expansion inside the core of the nuclear reactor.

The means for bearing on and retaining the fuel rods in the cells of a spacer grid generally comprise dimples projecting toward the inside of the cell relative to the peripheral wall, which are produced by cutting and pushing back the wall, and resilient leaf springs, also projecting toward the inside the cell relative to the wall, which are produced by cutting and pushing back a part of the wall, or which are added and fastened to the peripheral wall.

In general, two dimples are provided on each of two adjacent faces of the parallelepipedal peripheral wall and two leaf springs on the faces opposite the faces having the dimples. The fuel rod is contained inside the cell at six points, by the four dimples and the two leaf springs, the leaf springs and the dimples being produced so as to come in contact with the fuel rod in a region of small area, that can be likened to a contact point.

In addition to the transverse retention of the rods of the fuel assembly bundle, the spacer grids ensure mixing and stirring of the reactor cooling water that flows in contact with the fuel rods along the axial longitudinal direction.

The spacer grids for the fuel assemblies consist of metal plates of rectangular shape that are cut at mid-width in order to fit one over the other and assembled by welding, in the form of a lattice of square lattice cells.

To ensure that the cooling water is mixed and stirred upon leaving the spacer grid, the plates of the spacer grids are cut along their edge intended to come into the upper part of the spacer grid, in order to constitute mixing vanes that are folded over toward the inside the cells, alternately in one direction and in the other, so as to guide the fluid leaving one cell into a neighboring cell, and thus mixing the various fluid flows in contact with the fuel rods.

The plates used to produce a spacer grid must therefore be cut in a particular design and stamped or pushed back in order to form the dimples and leaf springs. In the case of leaf springs attached to the walls of the cells, it is also necessary to provide cuts for fastening the leaf springs and then to fit and weld the leaf springs, which may be made of a metal material different from that of the plates.

For example, the plates may be made of a zirconium alloy and the leaf springs of a nickel alloy.

Construction of the spacer grids is therefore complex, because they requires many cutting, stamping, fitting and welding operations.

In addition, the six-point retention of the fuel rods inside each of the cells may result in local wear of the rod cladding in contact with the dimples or leaf springs, by friction because the reactor cooling water sets the rods in vibration inside the spacer grids. This phenomenon, which is generally called "fretting wear", may result, over long periods of use of the nuclear reactor, in the cladding of the rods being punctured in the contact regions.

Finally, the ability of the vanes cut along the upper edges of the spacer grids to provide mixing is limited, so that perfect temperature homogenization of the cooling water flowing in the fuel assembly is not achieved. This may result in hot spots in contact with the rods in certain regions, where the boiling crisis phenomenon, that is to say the local formation of vapor bubbles in the cooling water, is observed to occur.

SUMMARY

The objective of the invention is therefore to propose a spacer grid for a fuel assembly in a light-water-cooled nuclear reactor, for providing the transverse retention of a bundle of fuel rods in mutually parallel arrangements, comprising an array of cells juxtaposed and placed in a regular lattice, each bounded and separated from neighboring cells by at least one peripheral wall which is open at two opposed ends, along the direction of an axis of the cell, so as to receive a fuel rod of cylindrical general shape passing along the cell along its axis parallel to the peripheral wall, and an arrangement for supporting and retaining the rod in a central position in which the axis of the rod lies along the axis of the cell, a free space being left between the cylindrical external surface of the fuel rod and the peripheral wall of the cell, in which the arrangement for bearing on and retaining the fuel rod in each of the cells housing a fuel rod comprise at least one element in a helical arrangement around the axis of the cell, comprising a wall having the form of a helical sheet extending transversely in the free space between the external surface of the fuel rod and the peripheral wall of the cell, so as to bear on the fuel rod over a substantial part of the height of the cell in the direction of its axis, this spacer grid being of simple construction and very effective as regards retaining the rods, while still limiting the phenomenon of fretting wear and having a very high capacity to mix the cooling water within the spacer grid and upon leaving it.

For this purpose, the at least one element in a helical arrangement of the arrangement for supporting and retaining a fuel rod consists of a part of the peripheral wall of the cell cut in the peripheral wall along a direction inclined to the axis of the cell and folded so as to constitute a blade-shaped first part of direction transverse to the peripheral wall and a second part approximately parallel to the wall of the cell and constituting a bearing surface for the external surface of the fuel rod, which second part is joined to the peripheral wall of the cell via the transverse first part constituting a spring leaf for retaining the rod and for guiding a cooling fluid in a helical arrangement around the axis of the cell.

BRIEF DESCRIPTION OF THE DRAWINGS

In order to make the invention clearly understood, a fuel assembly of a pressurized-water-cooled nuclear reactor, a spacer grid according to the invention and, for comparison, a spacer grid according to the prior art will now be described, by way of example and with reference to the figures appended hereto.

DETAILED DESCRIPTION

Figure 1:
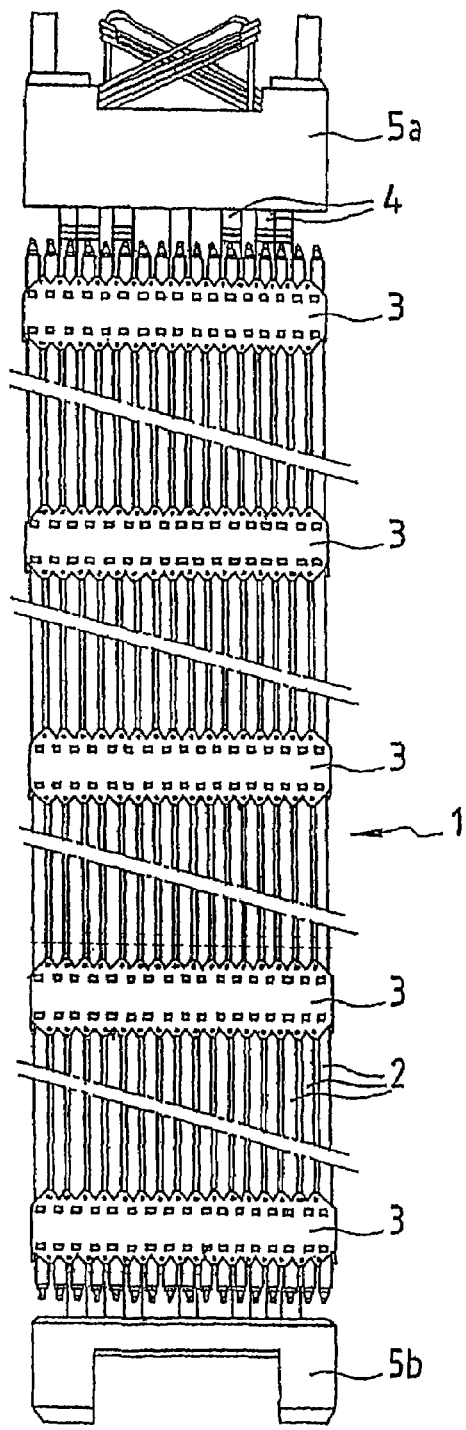
FIG. 1 is a side view in cross section of a fuel assembly of a pressurized-water-cooled nuclear reactor.

FIG. 1 illustrates a fuel assembly for a pressurized-water-cooled nuclear reactor, denoted overall by the reference numeral 1.

The fuel assembly 1 consists of a bundle of substantially cylindrical fuel rods 2 consisting of a metal cladding in which fuel pellets are stacked, the cladding being closed off at its ends by plugs.

The fuel rods 2 of the fuel assembly bundle are held in place by a framework, which comprises a plurality of spacer grids 3 distributed along the longitudinal direction of the fuel assembly, in the axial direction of the rods 2, guide tubes 4, which are placed inside the bundle of fuel rods 2 and joined to the grids 3, and an upper nozzle 5*a* and a lower nozzle 5*b* that are rigidly fastened to the ends of the guide tubes 4, the length of which is greater than the length of the fuel rods 2 of the bundle.

Figure 2:
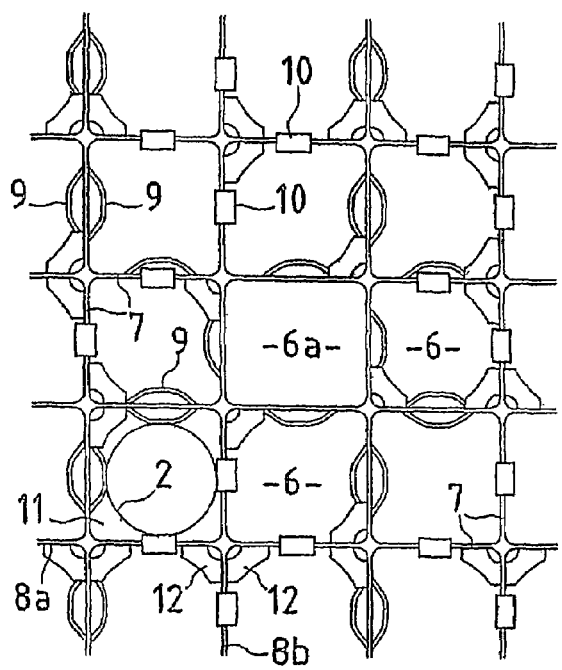
FIG. 2 is a plan view of a fuel assembly spacer grid produced according to the prior art.

The spacer grids, which ensure transverse retention of the fuel rods 2 of the fuel assembly bundle, comprise, as can be seen in FIG. 2, cells 6 of square cross section that are arranged in a regular lattice with square lattice cells. Each cell 6 has a peripheral wall 7 in the form of a square-based parallelepiped open at its two ends in the direction of the axis 6' of the cell, perpendicular to the plane of FIG. 2 and passing through the center of the square section of the cell.

The peripheral walls 7 of the cells 6 of the spacer grid 3 are formed by plates intersecting at right angles, constituting two families of mutually parallel plates 8*a* and 8*b*.

The plates 8*a* and 8*b* of the two families of plates are cut from metal sheets, for example made of zirconium alloy, and include, at distances corresponding to the sides of the cells 6, slots at mid-width that allow them to be assembled by mutual engagement in 90° arrangements, as shown in FIG. 2.

The assembled plates are then welded along the assembly lines constituting the edges of the cells 6 of the spacer grid. Prior to their assembly, the plates 8*a* and 8*b* are cut and stamped in order to form dimples 9 projecting toward the inside of the cells 6. The plates 8*a* and 8*b* also include openings that are cut at regular intervals, so as to fit and fasten leaf springs 10, which also project toward the inside of the cells 6. Each of the cells has two adjacent 90° walls, in each of which are produced, by cutting and pushing back the metal of the plates, two dimples 9 spaced apart along the axial direction of the cell. The other two walls of the cell, which are adjacent and at 90°, house leaf springs 10. In this way, six points of contact are provided inside each of the cells 6 for a fuel rod 2 inserted along the direction of the axis 6' in a centered position inside the cell 6. The outside diameter of the fuel rod 2 is substantially less than the length of a side of a cell 6, such that a free space 11 is left around the cylindrical external surface of the rod 2, inside the peripheral wall 7 of the cell in which the rod is held in a centered position by the dimples 9 and the leaf springs 10.

The plan view of FIG. 2 is a top view of a spacer grid and this illustrates that the plates 8*a* and 8*b* constituting the spacer grid are cut along their upper edge in order to form the vanes 12 for mixing the cooling water flowing inside the cells in contact with the external surface of the fuel rods 2. The mixing vanes 12 are folded over toward the inside of the cells so as to direct the cooling water as it leaves each of the cells toward a neighboring cell. This thus produces a mixing effect on the water flowing in contact with each of the fuel rods along the axial direction.

The plates 8*a* and 8*b* of the spacer grid 3 must be stamped in order to produce projecting dimples on their two faces, each of the plate portions ensuring, at each cell, the separation of two neighboring cells in which the dimples are produced on the same plate.

The construction of a spacer grid is therefore complex and requires many cutting, forming and assembling operations. In addition, the retention of the fuel rod 2 inside a cell 6 of the spacer grid is provided only in six regions of small area constituting points of contact.

Furthermore, within the lattice of cells, it is necessary to produce cells 6*a* of special type that allow the passage, and possible fastening, of the fuel assembly guide tubes 4.

Figure 3A:
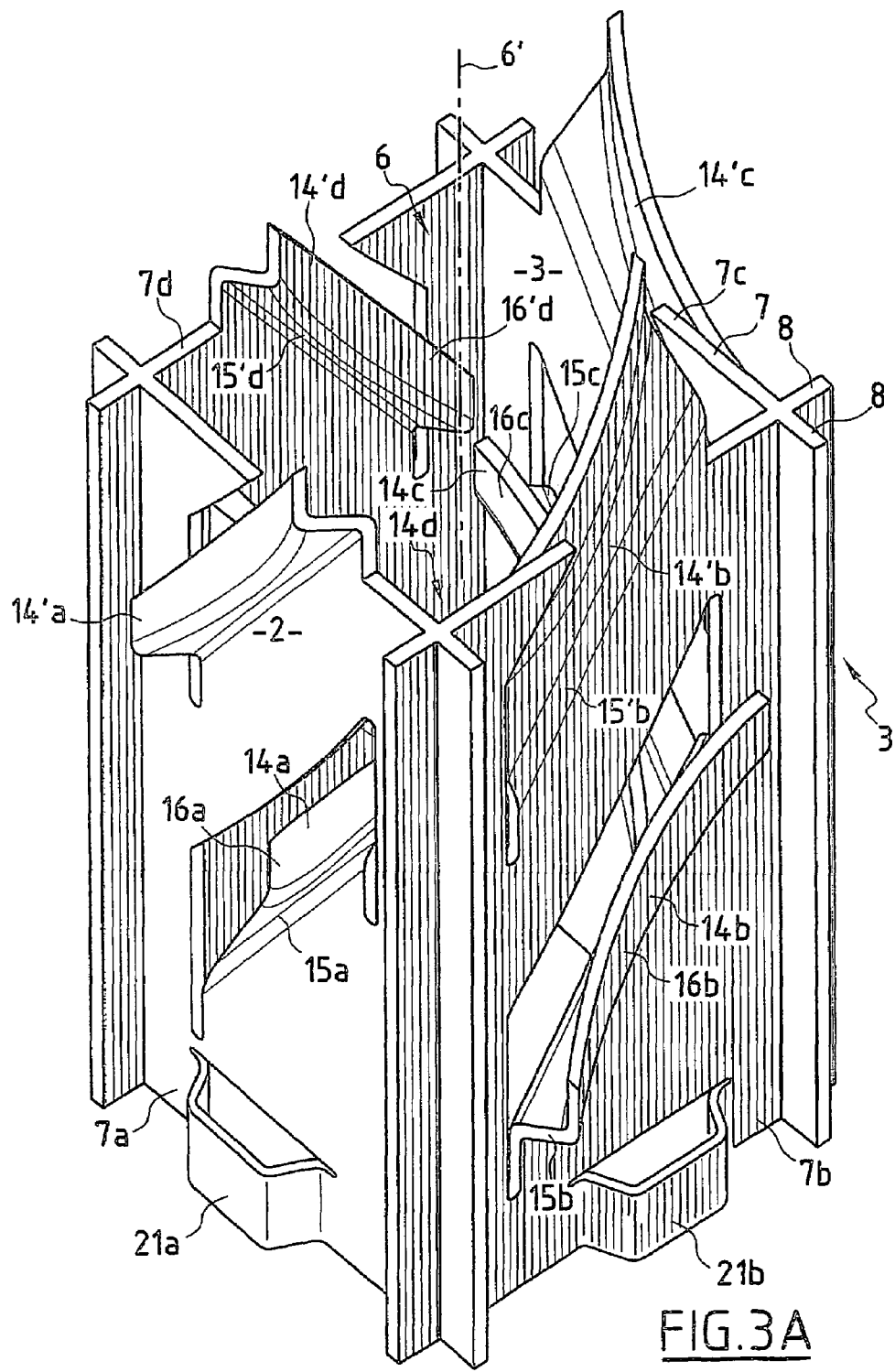
FIG. 3A is a perspective view of a cell of a spacer grid according to the invention.
Figure 3B:
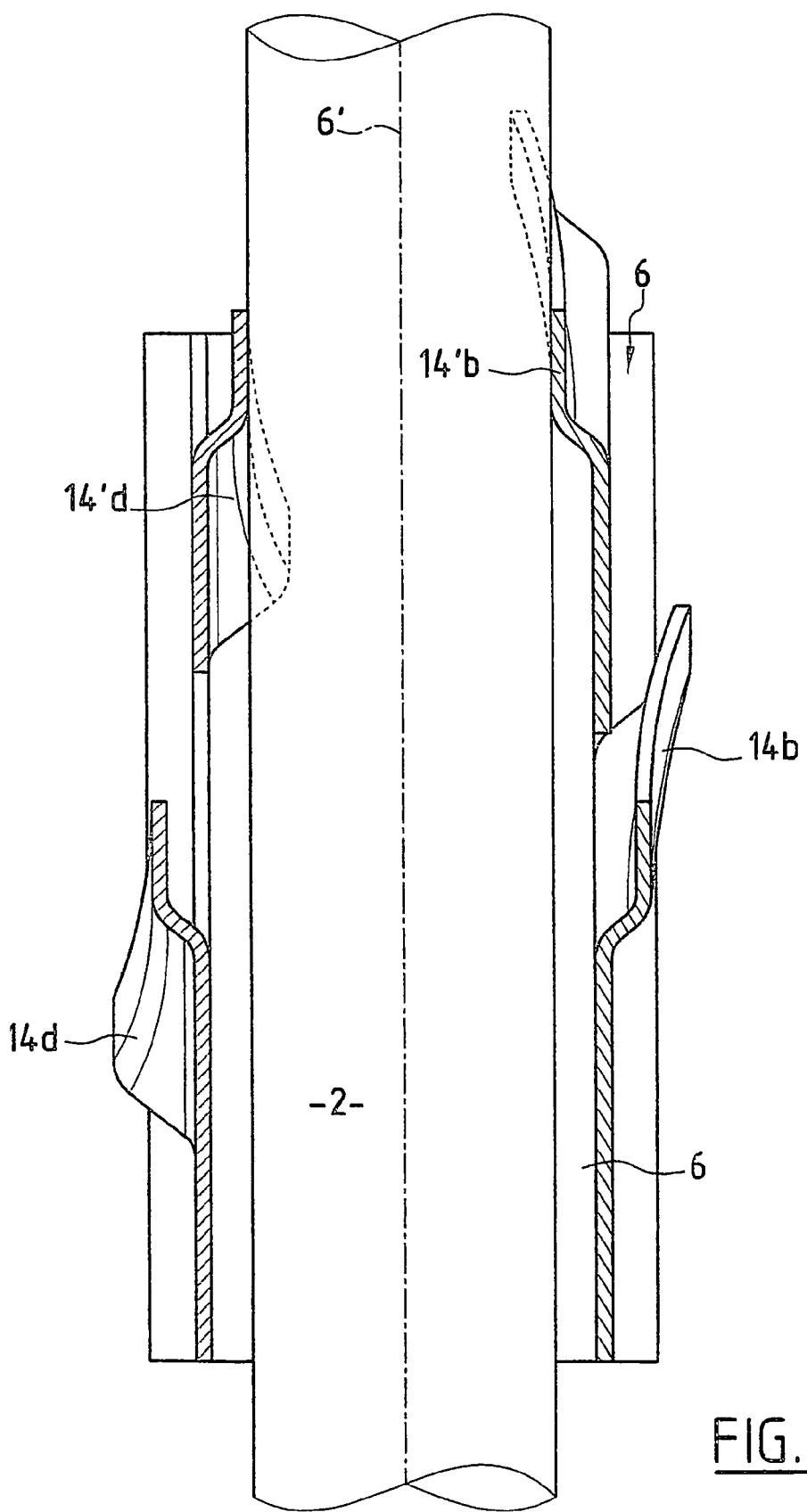
FIG. 3B is an axial sectional view of the cell shown in FIG. 3A, into which a fuel rod has been inserted.

FIGS. 3A and 3B show a cell of a spacer grid according to the invention, which can be used as a replacement for a spacer grid according to the prior art as shown in FIG. 2.

In general, the spacer grid 3 according to the invention is produced in a manner similar to the spacer grid according to the prior art, from metal plates 8 that are assembled and fastened together by welding at right angles in order to constitute a lattice of cells 6 of square cross section, each bounded by a peripheral wall 7 in the form of a square-based parallelepiped formed by plate portions 8 joined together at right angles.

Produced on each of the plate portions constituting one of the faces of the peripheral wall 7 of a cell 6, by cutting and bending, are two elements for bearing on and retaining a fuel rod which are arranged in general along a helix having as axis the axis 6' of the cell 6.

The four faces of the peripheral wall 7 of the cell 6, having the shape of a parallelepiped of square cross section, are denoted by 7*a*, 7*b*, 7*c* and 7*d*.

Produced in the metal of the face 7*a*, by cutting and bending, are two elements 14*a* and 14'*a* which are arranged, in the case of the first one (14*a*), in the lower end part and, in the case of the second one (14'*a*), in the upper end part of the face 7*a* of the wall 7.

Likewise, respective bearing and retaining elements 14*b*, 14'*b*, 14*c*, 14'*c* and 14*d*, 14'*d*, respectively, are produced on the successive faces 7*a*, 7*b*, 7*c* and 7*d* by cutting and bending.

The bearing and retaining elements 14a, 14b, 14c and 14d lie in the lower part and the elements 14'a, 14'b, 14'c and 14'd are produced by cutting and bending in the upper part of the peripheral wall 7 of the cell 6.

The view shown in FIG. 3B represents an axial cross section through the opposed faces 7b and 7d.

As illustrated in FIGS. 3A and 3B, the elements for bearing on and retaining a rod 2 in the cell 6 are produced by cutting one face of the wall 7 in a direction inclined to the axis 6' of the cell 6, so that the cuts are all directed upward, when the cell 6 is rotated about the axis 6' in the direction going from the right to the left in FIG. 3A, this direction corresponding to the direction of winding of the upwardly directed helices formed by the successive bearing and retaining elements of the cell 6.

The successive cuts in the faces of the peripheral wall 7 of the cell 6 have generally rectangular shapes, the short sides of the rectangular cuts being directed along directions parallel to the axis 6' of the cell and the cut having a single inclined long side directed along the direction of winding of the helix of the bearing and retaining elements of the cell, the cut being joined to the wall via its second long side along which the bending of the wall takes place. This long side and the cut make an angle of around 30° with the direction of the axis 6' of the cell 6.

The successive bearing and retaining elements 14a, 14'a, through 14d, 14'd are produced by bending the corresponding cuts along directions approximately parallel to the long side of the cut joining the wall.

The successive bearing and retaining elements 14a, 14'a, through 14d, 14'd are produced by bending the cuts out of the plane of the face of the wall 7 in which the cut is made.

The cut is firstly bent (for example at 45°) with respect to the plane of the face of the wall and secondly bent upward toward the top of the cell, along lines of bending approximately parallel to the long side of the cut and lying substantially along helix portions wound in the desired direction about the axis 6' of the cell. What is thus obtained is a wall (for example 15a or 15b) of the corresponding bearing and retaining element 14a or 14b directed transversely with respect to the axis 6' and to the face of the wall 7, and a second wall (16a or 16b) substantially parallel to the face of the wall 7 of the cell.

The cuts are bent successively toward the inside and toward the outside of the cell 6 for successive cuts along the direction of the axis 6' and along the direction of winding of the helix in which the bearing and retaining elements are arranged.

Thus, the first wall 15a of the first bearing and retaining element 14a is bent toward the inside of the cell 6 and the second wall 16a of the first element 14a folded parallel to the face 7a of the wall inside the cell 6. In contrast, the first wall 15b of the second bearing and retaining element 14b is folded toward the outside of the cell 6, in a cell neighboring the cell 6, and the second wall 14b of the second bearing and retaining element 14b is folded in an arrangement substantially parallel to the face 7b of the wall 7, in the cell neighboring the cell 6.

The bearing and retaining element 14'a, lying in the upper part of the first face 7a of the wall 7 of the cell 6 in the axial alignment of the bearing and retaining element 14a lying in the lower part of the face 7a of the wall 7 is folded in the opposite direction to the bearing and retaining element 14a, that is to say toward the outside.

Each of the successive bearing and retaining elements, along the axial direction or along the direction of the helix in which the bearing and retaining elements are wound, is therefore folded in a different direction from the previous one.

Consequently, the element 14c is folded inward and the element 14b folded outward, the element 14'b, located in the upper part of the cell 6, is folded inward, whereas the successive elements 14'c and 14'd are folded toward the outside and toward the inside of the cell 6, respectively.

The second walls, such as 16a, 16b or 16d visible in FIG. 3, of the respective bearing and retaining elements 14a, 14b, and 14'd are bent so as to have the shape of a ring portion having a diameter approximately equal to the diameter of a rod 2 of the fuel assembly.

These second walls, such as 16a, 16b or 16'd are intended to come into contact with the external surface of a rod 2 inserted into the cell 6 or into a neighboring cell.

The bearing and retaining elements cut in the upper part of the faces 7a, 7b, 7c and 7d of the peripheral wall 7 of the cell 6 are produced in the form of vanes projecting upward with respect to the upper edge of the peripheral wall 7 of the cell 6. To do this, parts of the plates projecting from one of the edges of the plates are cut, these plates being folded on one side of the plate in order to constitute the two walls of the bearing and retaining elements that also constitute a vane for guiding and mixing of the fuel assembly cooling water.

The vanes such as 14'a or 14'c, which are folded toward the outside of the cell 6, include an upper end part (in the direction of winding of the helical retaining elements) which is directed toward a neighboring cell of the cell 6.

The first walls, such as 15a or 15b of the bearing and retaining elements, which are bent in a direction perpendicular or inclined to the face of the wall in which the cut is produced, constitute blades of direction transverse to the walls of the cell, lying along helix portions wound in the direction of winding of the successive retaining elements cut in the walls of the cell 6.

The first walls or blades 15a, 15'b, 15c and 15'd, directed toward the inside of the cell, constitute blades of transverse direction between the plane of the face of the corresponding wall and a bearing surface of the fuel rod which can be inserted into the cell 6, which surface is formed by the curved internal surface of the second wall 16a, 16'b, 16c or 16'd of the corresponding bearing and retaining element.

When a fuel rod 2 is inserted into the cell 6 along the axis 6' of the cell 6, as shown in FIG. 4, the external surface of the rod 2 comes into contact with the second surfaces 16a, 16'b, 16c and 16'd of the four bearing and retaining elements folded toward the inside of the cell 6. The corresponding first walls 15a, 15'b, 15c and 15'd of transverse direction, having the shape of a helix portion, which extend between the peripheral wall 7 of the cell 6 and the second wall bearing on the external surface of the rod, exhibit elasticity allowing them to ensure resilient retention of the rod 2, the bearing and retaining elements 14a, 14'b, 14c and 14'd directed toward the inside of the cell 6 being folded so that the internal bearing surfaces of the second walls 16a, 16'b, 16c and 16'd lie on a cylindrical surface having as axis the axis 6' of the cell and having a slightly smaller diameter than the diameter of the rod. When the rod 2 is inserted along the axis 6' of the cell 6, into the cell 6, the rod 2 moves the bearing surfaces slightly apart, using the elasticity of the transverse blades in the form of helix portions.

The four bearing surfaces of the second walls 16a, 16'b, 16c and 16'd come into contact with the rod 2, in two regions, the total height of which, along the axial direction 6' of the cell 6, is approximately equal to or slightly less than the total height of the cell 6 along the direction of the axis 6'.

The rod is thus retained in contact with bearing surfaces over a total height approximately equal to the height of the cell 6, that is to say to the height of the spacer grid. The total area of the four bearing regions of the four retaining and bearing elements 14a, 14'b, 14c and 14'd inside the cell 6 is therefore large and substantially greater than the total bearing area of the four dimples and two leaf springs of a cell of a spacer grid according to the prior art. Thus, the bearing pressure on the rod 2 and the risk of fretting wear, on the assembly in service in the nuclear reactor, are reduced.

Moreover, the reactor cooling water flowing vertically in contact with the outer surface of the fuel rod 2 is guided by the first transverse walls in the form of helical blades of the four inwardly folded elements of the cell, so as to constitute a helical stream around the rod 2, in the free space between the external surface of the rod and the peripheral wall 7 of the cell 6. The bottom vane 14a and top vane 14'b located on two adjacent faces of a cell ensure successive guiding of the fluid each over one quarter of a turn, so that the cooling water describes a portion of a helix over approximately 180°, on passing through the cell; the vanes 14c and 14'd have a similar effect. As a result, the fluid is guided inside the cell 6, promoting heat exchange with the external surface of the rod 2. In addition, the bearing and retaining elements produced in the upper parts of the peripheral wall 7 of the cell 6 which are directed either toward the inside of the cell 6 or toward the outside and toward neighboring cells ensure very good stirring and very good mixing of the stream flowing in contact with the rod inside the cell 6 and of the streams flowing in contact with the fuel rods located in the cells neighboring the cell 6.

Furthermore, the production of a spacer grid according to the invention requires only simple cutting and bending operations on the various plates intended to form the spacer grid by fitting them together at right angles and welding them, as in the case of the prior art.

In addition to the bearing and retaining elements 14a, 14'a, through 14d, 14'd that constitute resilient dimples for bearing on the rods, rigid dimples such as 21a and 21b may be produced by cutting and pushing back the metal of the walls of the cell. Two dimples, such as 21a and 21b produced on two adjacent walls of the cell 6 may be pushed back toward the outside of the cell 6 and two dimples produced on the other two adjacent walls of the cell 6 may be pushed back toward the inside of the cell. Each cell therefore has two rigid dimples for bearing on the rod, for example in the bottom part.

Figure 5:
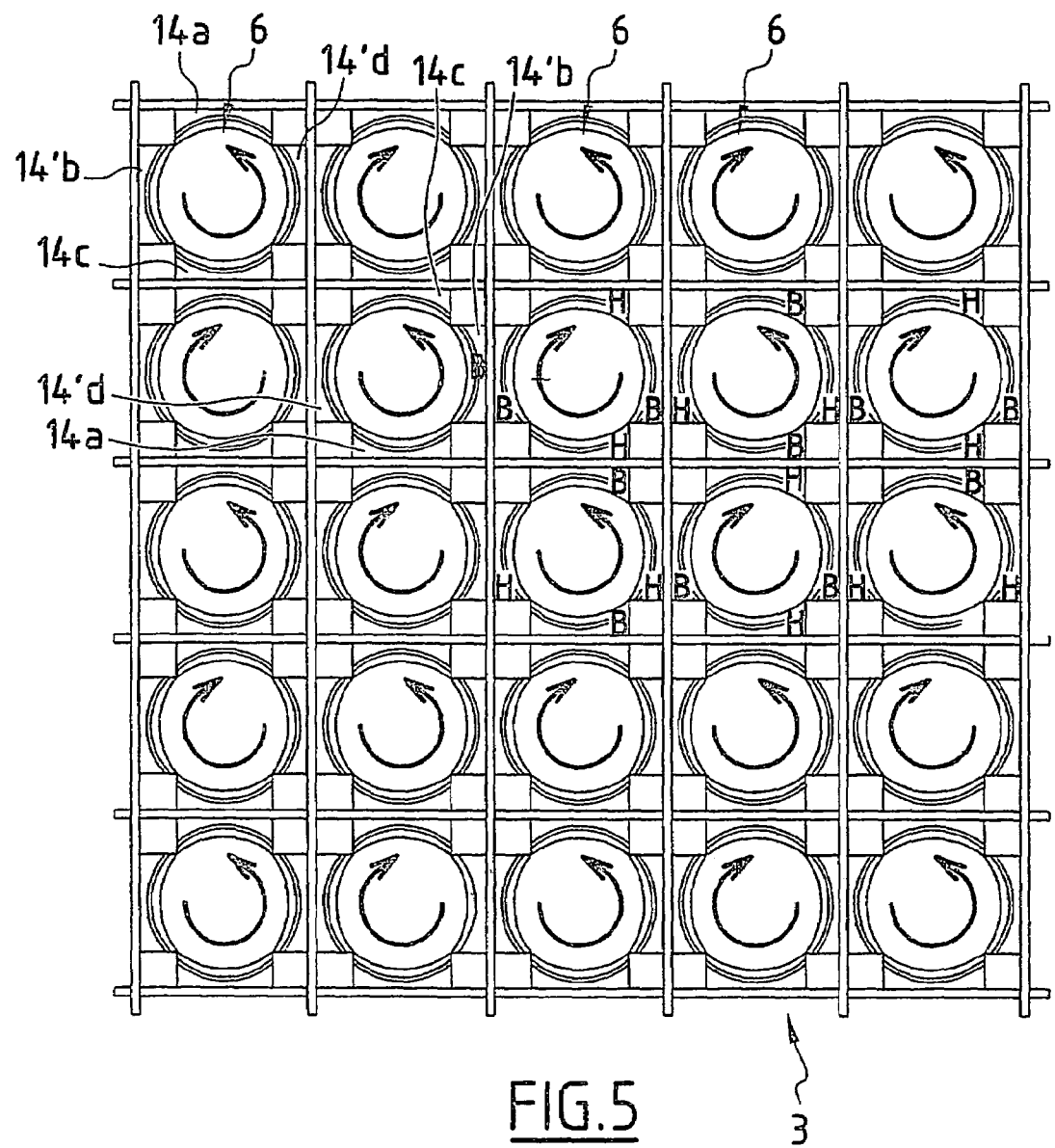
FIG. 5 is a plan view of a prior art of a spacer grid according to the invention.

FIG. 5 shows in plan view part of the spacer grid 3 according to the first embodiment, this part of the spacer grid comprising five rows of five cells 6.

Inside two cells 6, and indicated by reference numerals similar to those used in FIG. 3, are the bearing and retaining elements 14a, 14'b, 14c and 14'd folded toward the inside of the cell, the elements 14a and 14c being produced in a lower part of the peripheral wall 7 of the cell and the elements 14'b and 14'd in upper parts of the wall 7 of the cell.

Throughout the view shown in FIG. 5, the reference H denotes the helical bearing, retaining and fluid-guiding elements cut in an upper part of the wall of a cell and the reference B denotes the bearing, retaining and guiding elements cut in a lower part of the wall 7 of a cell.

Owing to the fact that, in each of the faces of the peripheral wall 7 of a cell, a bearing and retaining element is cut in a lower part of the face of the wall and a bearing, retaining and guiding element is cut in an upper part of the face of the peripheral wall of the cell, these elements being folded on either side of the wall, such as toward the inside and toward the outside of the cell 6 in question, each face of a peripheral cell wall allows a bearing, retaining and guiding element to be produced either in the top part or bottom part of the cell, said element being arranged along a helix having a clockwise or counterclockwise winding direction along the direction of flow of the fluid through the spacer grid, such as from the bottom upward, and a second bearing, retaining and guiding element inside a cell neighboring the cell, in a helix having a direction of winding opposite the direction of winding of the helix of the first cell.

FIG. 5 shows the directions of guiding of the fluid flow by helical bearing, retaining and guiding elements in the twenty-five cells 6 shown in adjacent positions.

The direction of rotation of the fluid in each of the cells 6 alternates from one cell to any neighboring cell. This flow characteristic of the fluid favors mixing and prevents a resultant torque being applied to the spacer grid, due to the flow of the fluid.

To optimize the fuel rod retention characteristics and the cooling water mixing characteristics, the following parameters may be adjusted:

the angle of inclination of the helix to the vertical direction of the axis of the cells;

the relative height of the top and bottom helices in each of the faces of the peripheral wall of the cells;

the position of the helical retaining and guiding elements with respect to the bottom of the plates constituting the spacer grid;

the height above the upper edge of the spacer grid of the projecting part of the retaining and guiding elements lying in the upper part of the cells of the spacer grid;

the width of the transverse blade constituting the flexible region of the helical retaining and guiding element; and the length of the region for contact between the helical retaining and guiding element and the rod 2 placed inside a cell.

In each of the cells of the spacer grid intended to house a fuel rod, it is possible to produce, on at least one wall of the cell, by stamping the plate constituting the wall, at least one stamped feature projecting into the cell, such as a dimple. Thus the movement of the rod in the cell is limited and its embedment is reinforced.

Figure 4A:
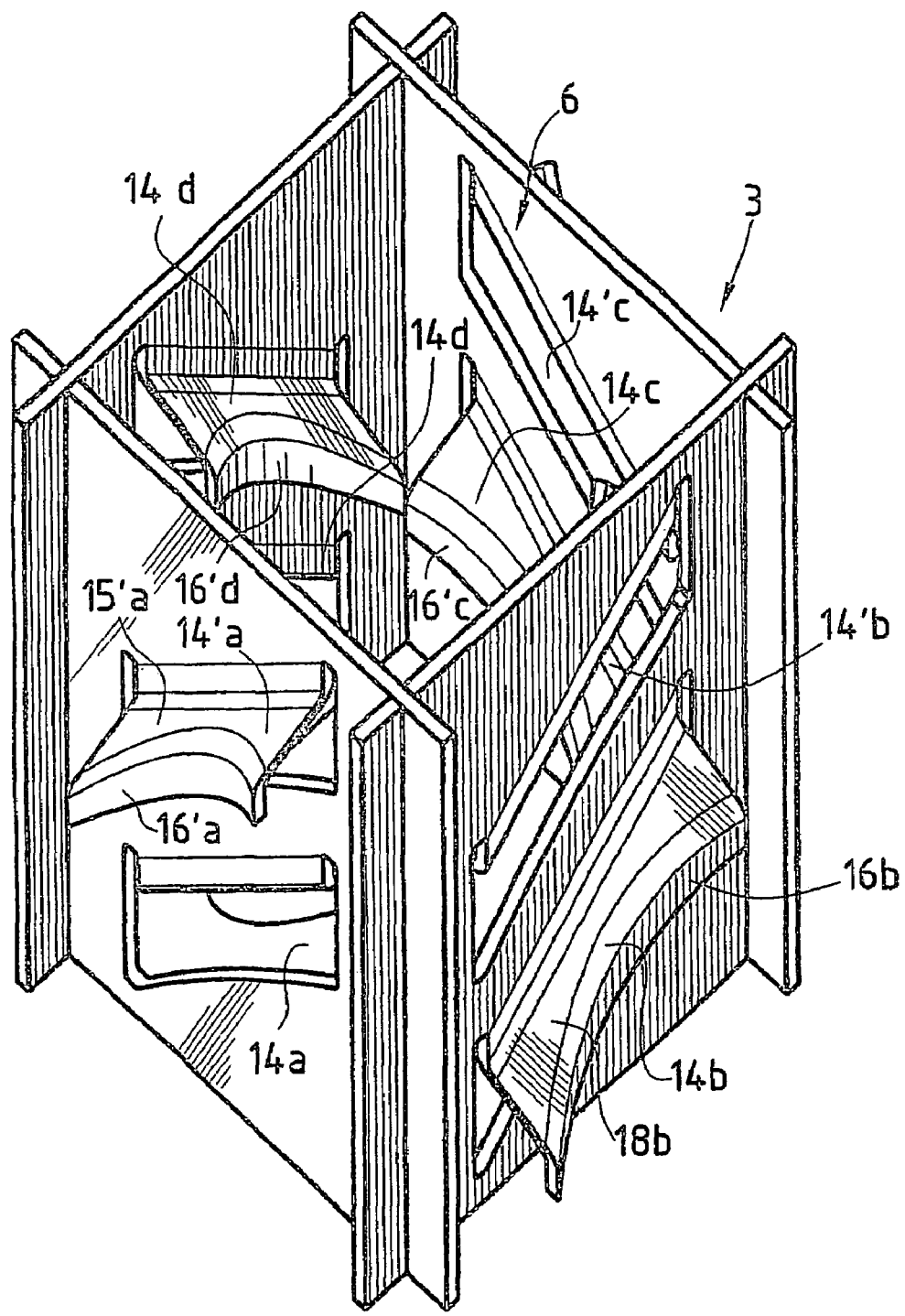
FIGS. 4A and 4B, which are similar to FIGS. 3A and 3B respectively, relate to an alternative embodiment of the spacer grid.
Figure 4B:
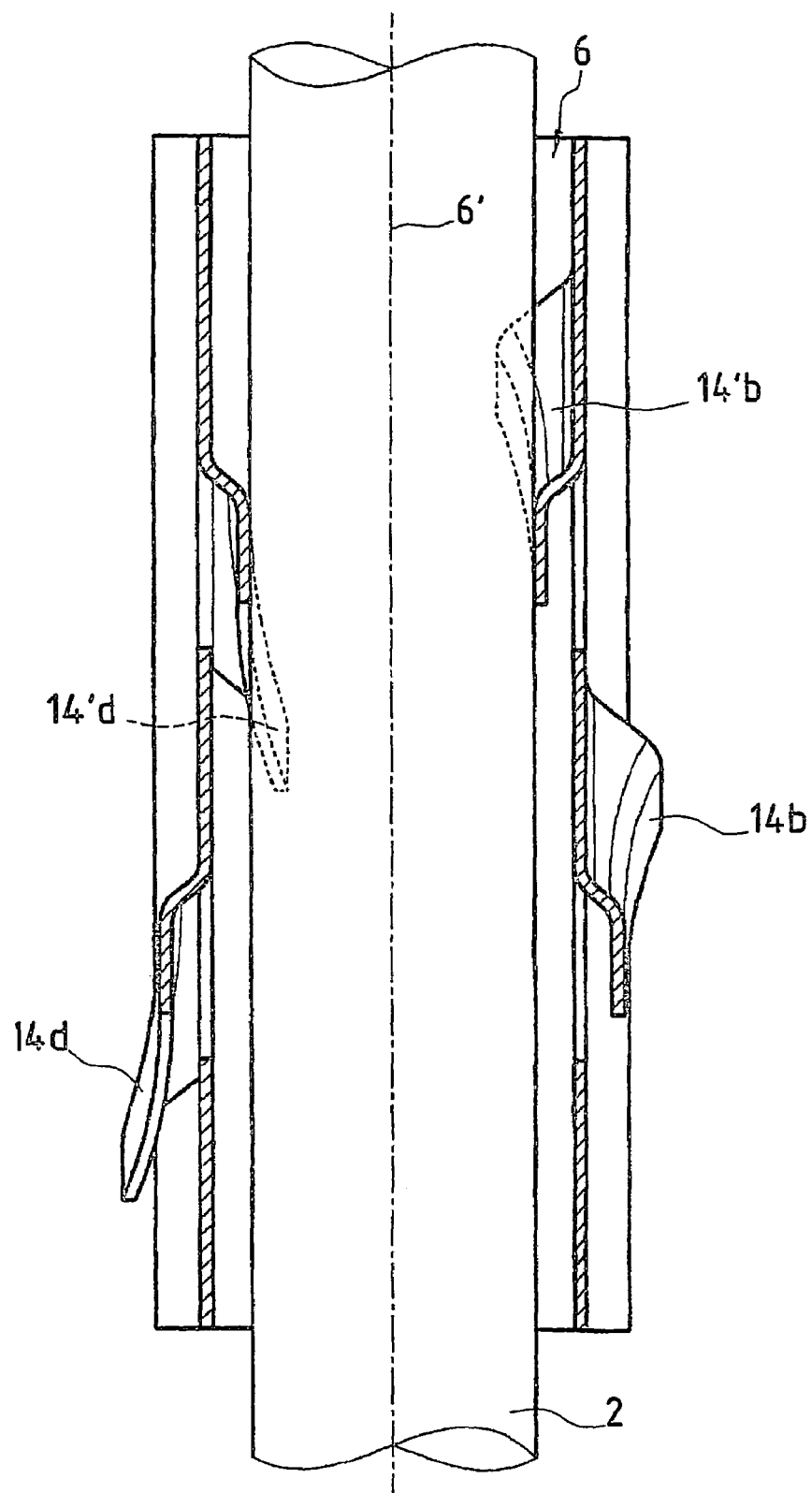

In the case of the alternative embodiment shown in FIGS. 4A and 4B (the elements corresponding to those shown in FIGS. 3A and 3B being assigned the same reference numerals), the vanes such as 14a and 14'a, 14b and 14'b, 14c and 14'c, 14d and 14'd lying in bottom and top respective parts of the walls of a cell 6 of the spacer grid 3 are folded alternately toward the inside and toward the outside of the cell in the same manner as the vanes shown in FIGS. 3A and 3B.

However, unlike the vanes of the cell shown in FIGS. 3A and 3B, the first walls such as 15'a, 15c, 15'b or 15'd of the vanes, in the form of transverse blades, are folded downward (for example at 45°) and not upward. Likewise, the second walls such as 16'a, 16b, 16c or 16d, which ensure that the rod bears on a cylindrical bearing surface, are folded downward.

When cooling water is flowing through the cell 6, the bearing surfaces of the vanes are pressed against the rod under the effect of the hydraulic forces. Hydraulic exchange inside the cell is also promoted.

The top and bottom vanes may be cut in the walls of the cell at a certain distance from the upper edges of these walls.

The invention is not strictly limited to the embodiment that has been described.

Thus the helical retaining and guiding elements may make an angle of inclination to the axis of the cell or of the fuel rod different from 30° and the retaining and fluid-guiding element of each of the cells of the spacer grid may be produced in a manner different from those that have been described.

The invention applies in general to any spacer grid for a fuel assembly of a light-water-cooled nuclear reactor ensuring transverse retention of the rods constituting a bundle in which the rods are mutually parallel.

What is claimed is:

1. A nuclear fuel element comprising a bundle of fuel rods and a framework for holding the bundle, wherein each of the fuel rods are of substantially cylindrical shape, and said framework comprises a plurality of spacer grids for a fuel assembly in a light-water-cooled nuclear reactor, for providing a transverse retention of the bundle of fuel rods in mutually parallel arrangements, at least one of the plurality of spacer grids comprising:

an array of cells juxtaposed and placed in a regular lattice, each bounded and separated from neighboring cells by at least one peripheral wall which is open at two opposed ends, along a direction of an axis of the cell, the axis being vertical, so as to receive one of the fuel rods, said one of the fuel rods passing along the cell axis parallel to the peripheral wall, and an arrangement for bearing on and retaining the one of the fuel rods in a central position in which an axis of the one of the fuel rods lies along the axis of the cell, a free space being left between a cylindrical external surface of the one of the fuel rods and the peripheral wall of the cell, in which the arrangement for bearing on and retaining the one of the fuel rods in each of the cells housing a fuel rod comprises a wall having a form of a helical sheet extending transversely in the free space between the external surface of the one of the fuel rods and the peripheral wall of the cell so as to bear on the one of the fuel rods over a substantial part of the height of the cell in a direction of the axis of the cell, wherein the wall having a form of a helical sheet comprises at least one element in a helical arrangement with respect to the axis of the cell, wherein the at least one element in a helical arrangement consists of a part of the peripheral wall of the cell cut in the peripheral wall along a direction inclined to the axis of the cell and folded so as to constitute a blade-shaped first part of direction transverse to the peripheral wall and a second part folded with respect to the first part, the second part extending approximately parallel to the peripheral wall and constituting a bearing surface for the external surface of the one of the fuel rods, wherein the second part is joined to the peripheral wall of the cell via the transverse first part constituting a spring leaf retaining the one of the fuel rods and for guiding a cooling fluid in a helical arrangement with respect to the axis of the cell, and wherein the second part folded with respect to the first part bears on the one of the fuel rods over a part of the height of the cell in the direction of the axis of the cell.

2. The nuclear fuel element according to claim 1, wherein each cell of the array of cells has a:

square-based parallelepiped shape with four faces at 90°, and comprises a first element in a helical arrangement being produced in a first end part of the peripheral wall in the axial direction of the cell by cuffing and bending part of a first face of the peripheral wall, a second element in a helical arrangement being produced by cuffing and bending part of a second face of the peripheral wall adjacent the first face in a second end part along the direction of the axis of the cell, a third element in a helical arrangement being produced by cuffing and bending a portion of a third face adjacent the second face, in the first end part along the direction of the axis of the cell and a fourth element in a helical arrangement being produced by cuffing and bending a portion of a fourth face of the peripheral wall of the cell adjacent the third and the first faces, in the second end part of the peripheral wall along the direction of the axis of the cell.

3. The nuclear fuel element according to claim 2, wherein the elements in a helical arrangement and lying in the second end part of the peripheral wall along the direction of the axis of the cell project from an end edge of the peripheral wall at the second end of the peripheral wall and are folded toward cells neighboring the cell in the peripheral wall from which the elements are cut.

4. The nuclear fuel element according to claim 1, wherein the at least one element in a helical arrangement is inclined at an angle of 30° relative to the central axis of the cell.

5. The nuclear fuel element according to claim 1, wherein the at least one element in a helical arrangement is folded, in the axial direction and in a direction of winding of the helical arrangement, alternately to an inside of the cell and toward an outside of the cell in a cell neighboring the cell.

6. The nuclear fuel element according to claim 5, wherein the at least one element in a helical arrangement is cut and folded in the cell and in adjacent cells such that the direction of winding of the at least one helical element is reversed between the cell and any adjacent cell.

7. The nuclear fuel element according to claim 1, wherein the at least one of the plurality of spacer grids further comprises:

an arrangement of rigid dimples produced by cutting and pushing-back metal of the walls of the cell.

8. The nuclear fuel element according to claim 3, wherein the elements in a helical arrangement and lying in the second end part of the peripheral wall along the direction of the axis of the cell are arranged in the end of the peripheral wall and wherein the first part of said elements are folded with respect to the peripheral wall towards the first end of the peripheral wall.

* * * * *